No. 751,170. PATENTED FEB. 2, 1904.
A. E. HOPKINS & O. S. FELLOWS.
CAN ELEVATOR.
APPLICATION FILED AUG. 13, 1903.
NO MODEL. 6 SHEETS—SHEET 2.

No. 751,170. PATENTED FEB. 2, 1904.
A. E. HOPKINS & O. S. FELLOWS.
CAN ELEVATOR.
APPLICATION FILED AUG. 13, 1903.
NO MODEL. 6 SHEETS—SHEET 3.

No. 751,170. PATENTED FEB. 2, 1904.
A. E. HOPKINS & O. S. FELLOWS.
CAN ELEVATOR.
APPLICATION FILED AUG. 13, 1903.
NO MODEL. 6 SHEETS—SHEET 4.

No. 751,170. PATENTED FEB. 2, 1904.
A. E. HOPKINS & O. S. FELLOWS.
CAN ELEVATOR.
APPLICATION FILED AUG. 13, 1903.
NO MODEL. 6 SHEETS—SHEET 6.

No. 751,170.                                                    Patented February 2, 1904.

UNITED STATES PATENT OFFICE.

ARCHIBALD E. HOPKINS AND OLIN S. FELLOWS, OF MIDDLETOWN, NEW YORK; SAID HOPKINS ASSIGNOR TO SAID FELLOWS.

CAN-ELEVATOR.

SPECIFICATION forming part of Letters Patent No. 751,170, dated February 2, 1904.

Application filed August 13, 1903. Serial No. 169,337. (No model.)

*To all whom it may concern:*

Be it known that we, ARCHIBALD E. HOPKINS and OLIN S. FELLOWS, citizens of the United States, residing in Middletown, Orange county, and State of New York, have invented certain new and useful Improvements in Can-Elevators, of which the following is a specification sufficient to enable others skilled in the art to which the invention appertains to make and use the same.

Heretofore it has been customary to elevate cans from one level to another by means of belts provided with fingers which caught and carried up the cans individually. This necessitated the feeding of the cans to the elevator at a uniform rate of speed, so that each finger could take up a can, and was accomplished by the storage of a number of cans in the runway leading to the elevator. If the runway became empty, succeeding cans ran down the runway and bumped against the elevator belt or fingers and were apt to turn on end or otherwise get out of alinement and block the runway. Thus in actual practice the can-finger elevator usually causes much trouble and loss of time, requiring much attention on the part of a special operator; otherwise the flow of cans in such so-called "automatic" elevators is interrupted from time to time, causing the stoppage of the entire can plant. We obviate this difficulty by means of our improved construction of can-elevator in which the cans pass from the runway into a flexible concave receiver, by which they are guided around the lower concave surface of a flexible elevator-belt, where it passes under the lower pulley of the elevator and to a convex guiding-surface arranged in a substantially vertical position opposed to the upwardly-moving surface of said flexible elevator-belt. By this means the timing or storage of the cans in the runway is rendered unnecessary, since each can as it enters the flexible convex receiver is immediately pressed by said receiver against the opposed surface of the flexible elevating-surface and rolled thereby not only over the flexible concave surface of the receiver, but also over the convex guiding-surface, to be discharged upon suitable conducting-ways. Thus it is not material whether the cans are fed rapidly or slowly to the receiver, since each can is in turn elevated as fast as received without relation to those immediately preceding or following it, so that the capacity of the elevator is practically unlimited. In other words, the cans may be said to flow to and through the elevator without timing, spacing, or retardation of any kind other than the restriction afforded by contact with the guiding and elevating surfaces by which the perfect alinement of the cans is maintained, and all this is accomplished automatically without requiring the attention of an operator. Furthermore, all danger of injury to the cans is avoided.

Our invention also includes the use of a flexible convex discharge-surface at the upper end of the elevator opposed to the upper elevator-pulley in situations where it is desirable to deliver the elevated cans in substantially the same direction as that in which they are fed to the receiver below, together with other special features in the construction and arrangement of parts hereinafter described and claimed specifically.

In the accompanying drawings, Fig. 3, a rear elevation, and Fig. 4 a central vertical sectional elevation, of the structure shown in Figs. 1 and 2; Fig. 5, a transverse section upon plane of line 5 5, Fig. 3.

A represents the lower or delivery end of a raceway, by which the cans are conducted from any source—as a can-soldering machine, testing or sorting machine—to the concave receiving-surface B of the can-elevator. The runway A is rigidly supported in position by any suitable means and is provided with side rails $a$ $a$, of which the side rails $a'$ $a'$ of the elevator form a continuation, said side rails being used, as heretofore, to prevent lateral movement of the cans upon surfaces upon which the cans roll.

C is a base-plate formed with two rigid standards $C'$ $C'$, united and supporting a crosshead $C^2$, to which the upright can-guiding surface is bolted or otherwise rigidly secured. The cross member $C^2$ also supports the upper or rear end of the concave can-receiver B, the lower or front end of which is supported upon the lower end of the runway A or upon any other stationary support.

Figure 8:
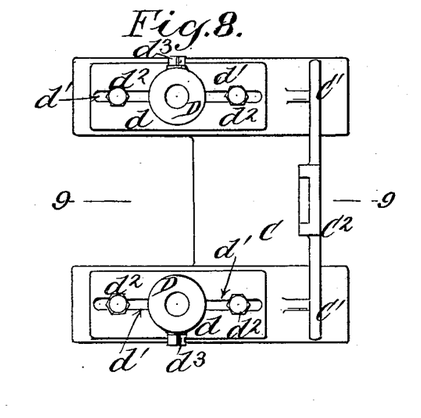
Fig. 8 is a plan of the supporting-base.
Figure 9:
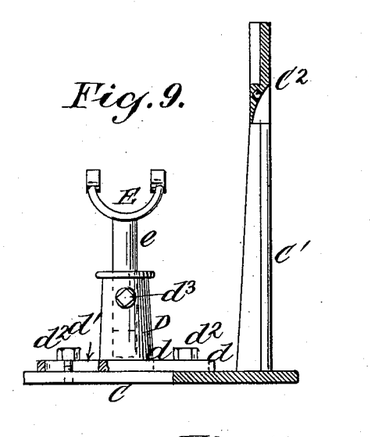
Fig. 9, a vertical section upon plane of line 9 9, Fig. 8.
Figure 10:
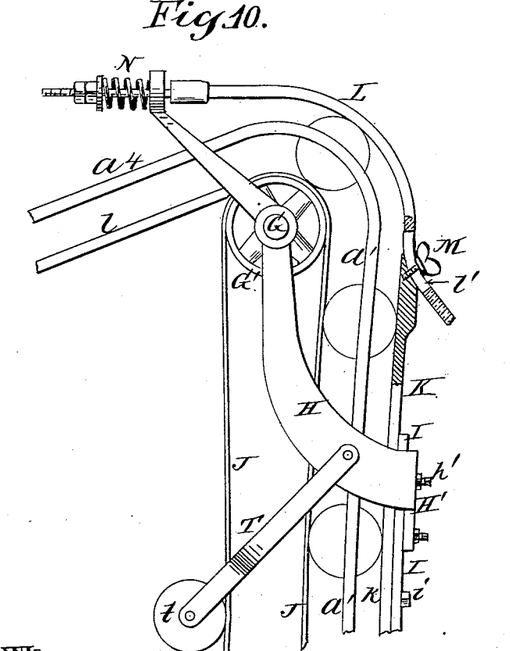
Fig. 10 is an elevation, partly in section, of the upper concave can-discharging guide.
Figure 11:
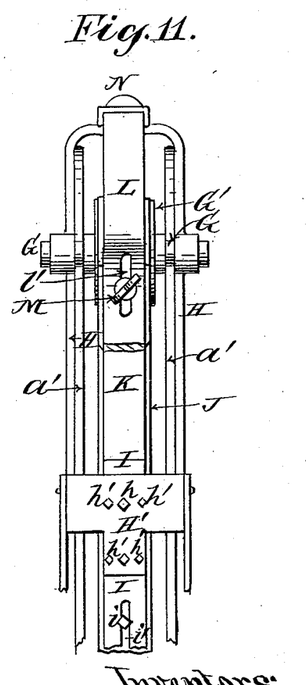
Fig. 11, a rear elevation of the parts shown in Fig. 10.

D D are hollow stands secured to the base-plate C by means which will admit of their adjustment horizontally thereon. This may be accomplished, as shown in Figs. 8 and 9, by forming elongated slots $d'$ $d'$ in the flanges $d$ $d$ of the said hollow stands, through which slots $d'$ $d'$ the bolts $d^2$ $d^2$, which secure the stands D D to the base-plate C, pass, or a like result may be attained by the substitution of any mechanical expedient, the object being to provide for the adjustment of the stands D D horizontally with relation to the rigid standards $C'$ $C'$. Fitting adjustably within the stands D D are the shanks $e$ $e$ of bifurcated posts E E, upon which are pivotally supported journal-boxes $e'$ $e'$ for the reception of the journals of the shaft F, upon which is mounted the power-pulley $F'$ and the lower belt-pulley $F^2$. The vertical adjustment of the bifurcated posts E E is effected by means of set-screws $d^3$ $d^3$ or equivalent means. It will thus be seen that provision is made for adjusting the shaft both vertically and horizontally. Provision is also made for adjusting the upper shaft G, carrying the pulley $G'$, both vertically and horizontally, by any desired or well-known means. As shown in the drawings, the shaft G is journaled in the ends of bracket-arms H H, which are integral with the bracket-plate $H'$. The bracket-plate is secured by means of the binding-screws $h$ $h$ to a vertically-adjustable plate I, secured in turn to the backbone or spine K, the inner surface $k$ of which constitutes the convex guiding-surface over which the cans are rolled upward by the opposed surface of the elevator-belt J. Of course the vertically-adjustable plate I may be secured to any other stationary part, if desired, provided the proper relationship of the shaft G and pulley $G'$ to the upright convex can-guiding surface $k$ is maintained. When placed upon the back of the spine K, it is adjustable vertically thereon by means of bolts $i$ $i$, passing through the elongated slot $i'$ (shown in Fig. 4) or by other appropriate means. The lateral or horizontal adjustment of the upper pulley-roller $G'$ with relation to the upright convex can-guiding surface $k$ when the means shown in Figs. 3, 4, 10, and 11 of the drawings are employed is accomplished by loosening the binding-bolts $h$ $h$, by which the bracket-plate $H'$ is held upon the vertically-adjustable plate I, and then tilting the bracket-plate $H'$ and arms H H more or less by means of the set-screws $h'$ $h'$, when, the desired distance of the pulley $G'$ from the said upright convex can-guiding surface having been attained, the binding-screws are again tightened to lock the parts in position. In the modifications shown in Figs. 15 and 16 the arms H H instead of being secured to the bracket-plate $H'$ are secured to an axle or fulcrum $H''$, mounted in a bearing formed in the vertically-adjustable plate $I'$, by which the height of the upper pulley-roller $G'$ is regulated, the lateral or horizontal adjustment of said roller $G'$ being effected by means of a bearing-screw $h^2$, engaging a cross-nut bar $h^3$, between and integral with the arms H H, said screw abutting against the rear of the spine K and thereby controlling the position of the arms H H and roller $G'$ with relation to the convex can-guiding surface $k$. By thus providing for both the horizontal and vertical adjustment of the lower pulley $F'$ and the upper pulley $G'$ with relation to the can-recever B and the upright convex can-receiving surface $k$ it is obvious that the device may be adapted to elevate cans of different diameters, since the distance of the elevating-belt J from the concave receiving-surface B and from the upright convex guiding-surface may be thereby varied and regulated at pleasure to suit the requirements of the cans to be raised.

Figure 1:
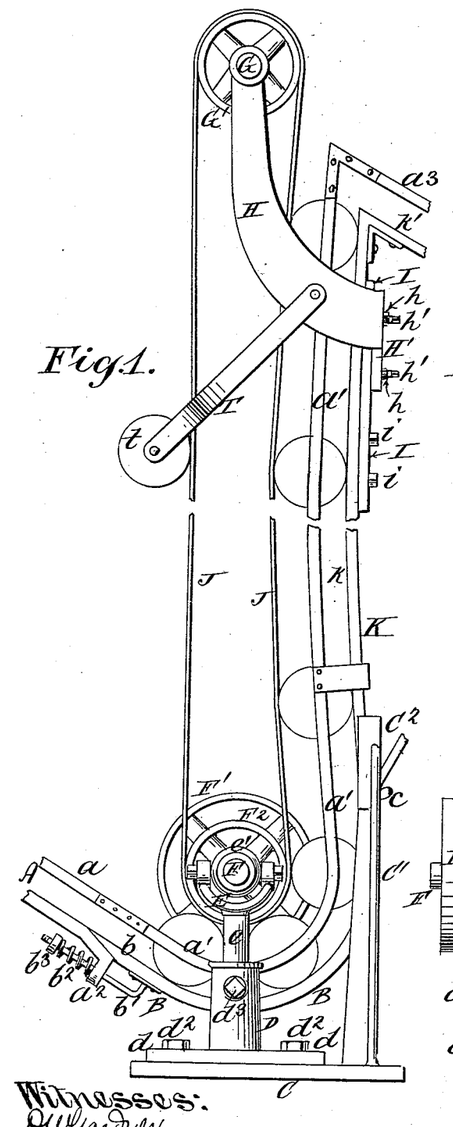
Figure 1 is a side elevation of our improved can-elevator arranged to receive and discharge the cans in the same direction.
Figure 2:
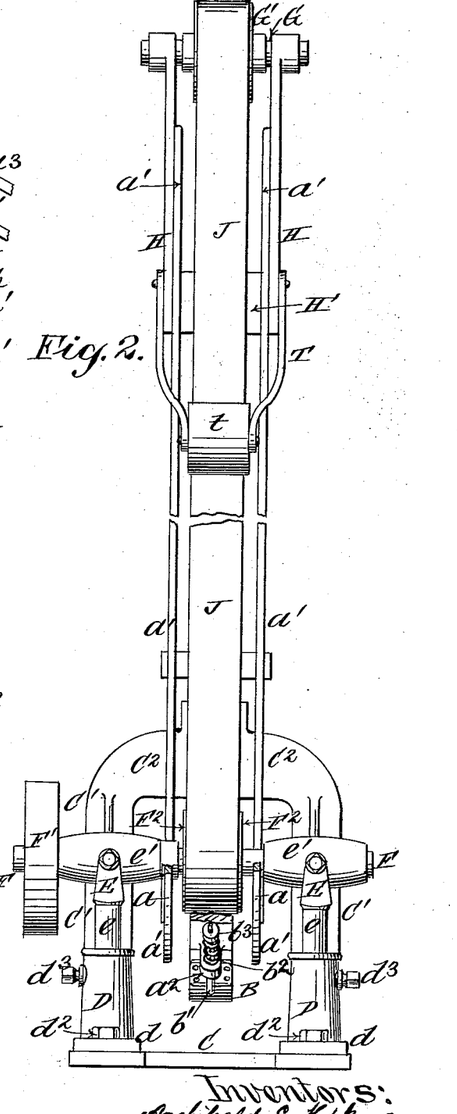
Fig. 2, a front elevation of the same.
Figures 3, 4, 5:
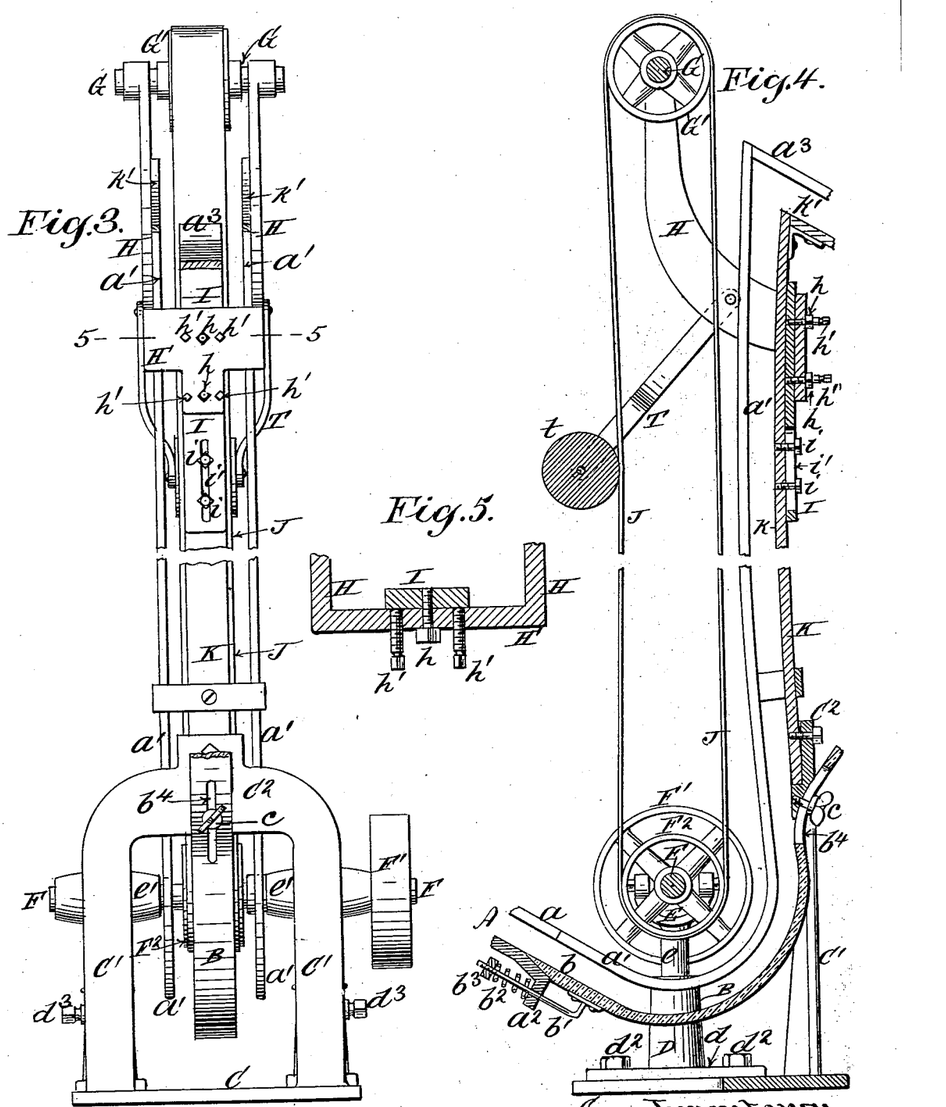
Figure 6:
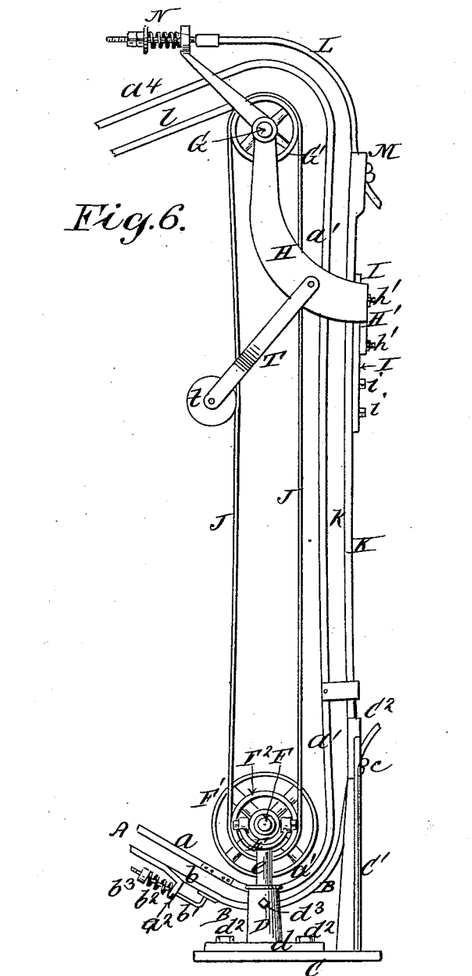
Figs. 6 and 7 are respectively a side and rear elevation of the can-elevator, upon a reduced scale, arranged to return the cans in the same direction in which they are received.
Figure 7:
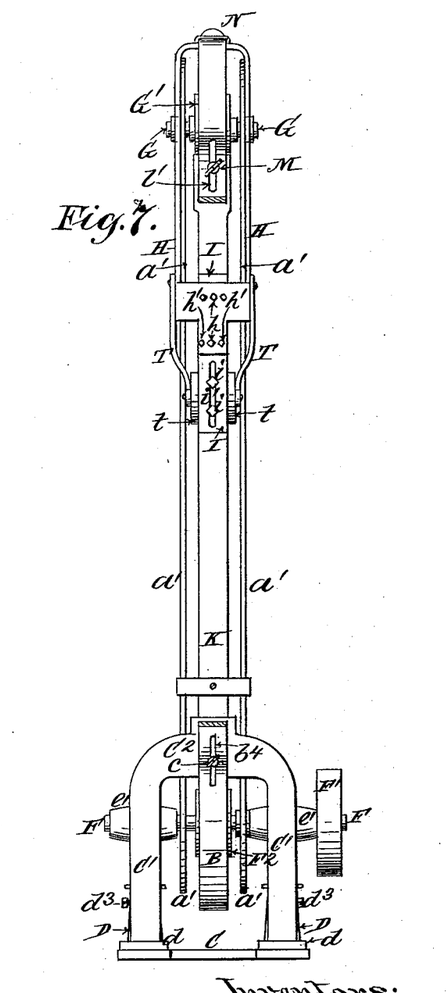

The concave can-receiver B is substantially concentric with the lower belt-pulley $F'$, and when the latter is adjusted to accommodate a prescribed size of can the curvature of the receiving-surface may be adjusted to correspond. The essential feature of our concave can-receiver is flexibility sufficient to yield under the cans as they pass around the lower pulley and belt, together with a degree of resiliency or retractile pressure that will enable it to press the cans firmly against the belt as the latter rolls the cans over its concave surface. A preferable construction is to form the receiver B of a suitable length and width of comparatively thick stiff leather secured at one end to the cross member $C^2$ of the base and supported at the other extremity by a spring-tension device, which will allow it to yield to conform to the number of cans passing over it, but which tends constantly to maintain it in its normal position with its concave surface protruding slightly into the path of the cans. Thus the forward or free end $b$ of the leather or other flexible material constituting the receiver may be secured on the under side to a tension-rod $b'$, passing through a lug $b^2$ on the under side of the runway A and carrying a spring $b^2$, interposed between said lug $a^2$ and a collar $b^3$, as illustrated in Figs. 1 and 4, so that the resilience of the spring is utilized in maintaining a close contact between the concave receiving-surface, the cans, and the convex surface of the elevating-belt J where it passes around the lower pulley $F^2$.

In order to provide for the accurate adjustment of the concave receiver B with relation to the lower pulley $F^2$, we secure the said flexible receiver to the cross member $C^2$ by means which will admit of the lengthening or shortening of the receiving-surface opposed to said lower pulley $F^2$. This may be accomplished by forming the flexible receiver with a longitudinal slot $b^4$, through which the binding-screw $c$, that secures the receiver to the said cross member $C^2$, passes, as shown clearly in Fig. 4, or by any other suitable mechanical expedient, it being obvious that by shortening the said flexible receiver the radius of its concave curvature will be increased, while by increasing its length between the two fixed points of support its radius of concave curvature will be reduced. For instance, when it is desired to adapt the elevator to cans of a larger size the lower pulley $F^2$ is moved away from the receiving-surface B at an angle of approximating forty-five degrees by adjusting the stands D D horizontally and the bifurcated posts E vertically, as hereinbefore set forth, the change in radial curvature of the flexible receiver being effected by loosening the binding-screw $c$ and shortening the receiver, so as to increase the radial length of curve and render its concave surface concentric to the axis of the wheel $F^2$, or substantially so.

Figure 12:
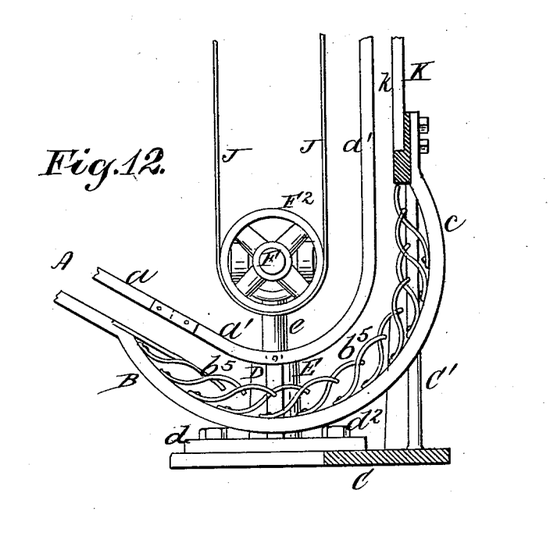
Fig. 12 is a sectional elevation of the concave can-receiver, showing a modification in the construction thereof.
Figure 13:
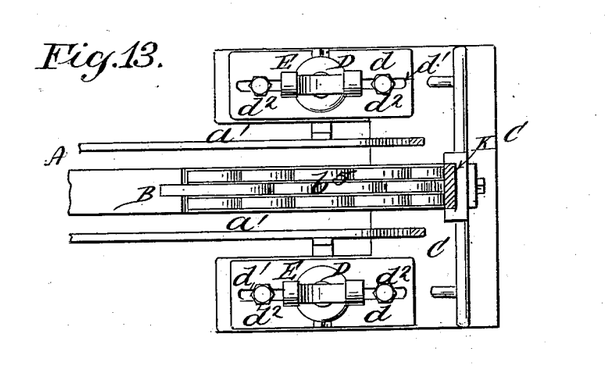
Fig. 13 is a plan of the parts shown in Fig. 12.

A modification of the flexible can-receiver B is shown in Figs. 12 and 13, in which the yielding surface afforded the cans is produced by a series of flat springs $b^5$, the free ends of which project slightly into the path of the cans, so as to force them up against the opposed convex surface of the elevator-belt J.

Figures 14, 15, 16:
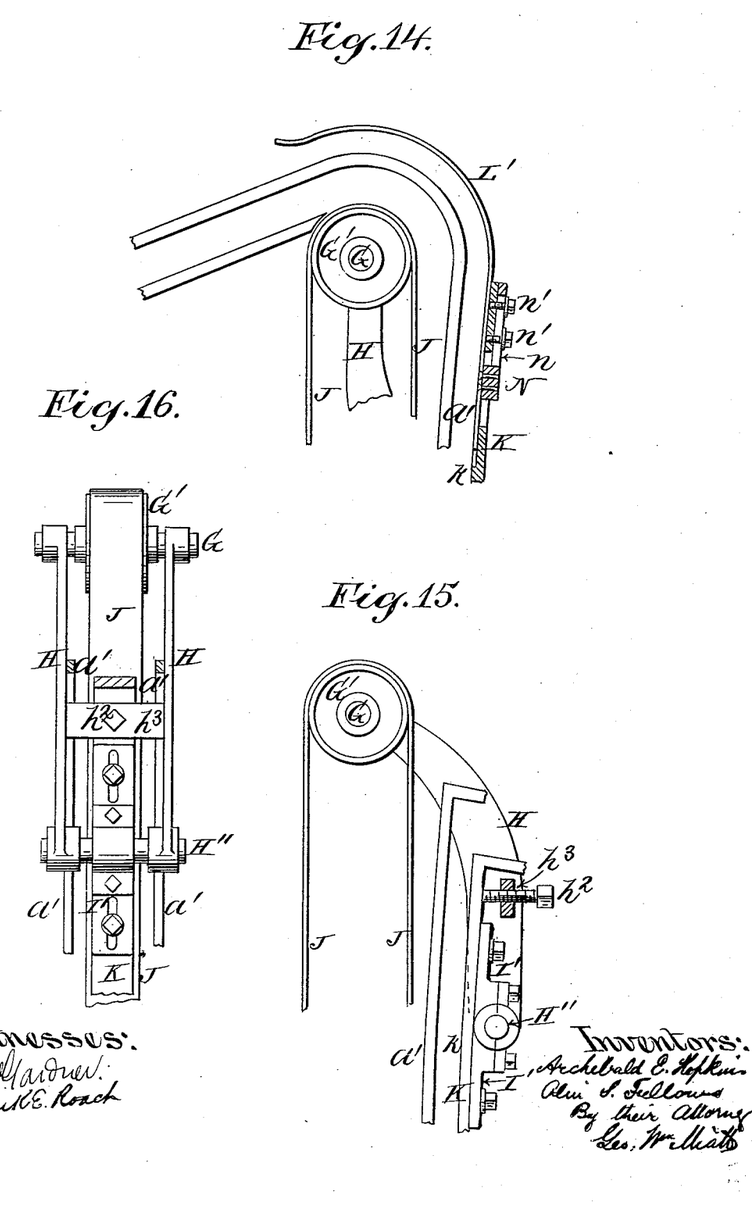
Fig. 14 shows a modification of the can-delivery mechanism shown in Figs. 6 and 7.
Figs. 15 and 16 illustrate a modification in the means employed for effecting the adjustment of the upper belt-roller.

In the first four figures of the drawings the elevator is shown as arranged to discharge the cans in the same general direction as that in which they are received, the upright convex guiding-surface $k$ conducting the cans to the downwardly-inclined delivery-ways $k'$ $a^3$.

Where it is desired to return the cans in the same or substantially the same direction in which they are fed to the elevator, we use a flexible discharging-surface L for conducting the cans around the upper pulley $G'$ to the return-ways $l$ $a^4$. This discharging-surface is essentially the same in construction, arrangement, and operation as the receiving-surface B, hereinbefore described, consisting of a strap L, of leather or other comparatively stiff but yielding material secured adjustably at one end to the upper portion of the upright guide K by a binding-screw M, passing through a slot $l'$ in the strap L, and sustained at the other end by a spring-tension device N or equivalent mounted upon an arm or extension of one of the brackets H or upon any other stationary part. A modification of this construction is shown in Fig. 14, in which a flat metallic spring $L'$ is substituted for the strap L. The spring may be mounted adjustably upon the spine K in any suitable manner, as by being riveted to a plate $N'$, formed with a vertical slot $n$, through which set-screws $n'$ $n'$ pass into engagement with female screw-threads formed in the back of the spine K.

In order to cause the can-elevating belt J to exert a uniform degree of pressure against the cans between it and the convex guiding-surface $k$ irrespective of the number of cans so interposed, we employ an automatic tension device T, arranged to hold the belt J taut by taking up the slack when fewer cans pass through the elevator and by yielding to adapt itself and the belt to an increase in the number of cans. It is obvious that this result may be attained by various well-known mechanical expedients, and the tension-roller $t$, pivotally suspended between the arms, which are in turn pivotally connected to the arms H H, is herein shown solely by way of illustrating a simple method of attaining the end sought.

We have herein necessarily illustrated and described certain specific means which render our improvements practical and operative, although we do not confine ourselves to the identical construction and arrangement of parts shown, since it is obvious that various modifications and mechanical expedients may be resorted to with like result and without departing from the spirit and intent of our invention, the distinguishing features of which are in a can-elevator the use, in conjunction with the substantially vertical convex guiding-surface and flexible elevating-surface, of flexible concave receiving and discharging surfaces, one or both, means for automatically maintaining tension upon the cans, and means for adjusting the parts to accommodate different sizes of cans.

What we claim, and desire to secure by Letters Patent, is—

1. In a can-elevator, the combination of an upright fixed convex can-guiding surface and an opposed flexible can-elevating surface, together with means for guiding the cans from the runway to said upright convex guiding-surface, substantially as set forth.

2. In a can-elevator, the combination of an upright convex can-guiding surface, an opposed flexible can-elevating surface, means for adjusting the said upright convex guiding-surface and the flexible can-elevating surface with relation to each other for the purpose set forth, and means for guiding the cans from the runway to said upright convex guiding-surface, substantially as set forth.

3. In a can-elevator, the combination of an upright convex can-guiding surface, an opposed flexible can-elevating surface, means for adjusting the said flexible can-elevating surface with relation to the said upright convex can-guiding surface for the purpose set forth, and means for guiding the cans from the runway to said upright convex can-guiding surface, substantially as set forth.

4. In a can-elevator, the combination of an upright fixed convex can-guiding surface, an opposed flexible can-elevating surface, means for automatically maintaining the tension of said flexible can-elevating surface, and means for guiding the cans from the runway to said upright convex can-guiding surface, substantially as set forth.

5. In a can-elevator, the combination with an upright convex can-guiding surface and opposed flexible can-elevating surface, of a flexible concave can-receiving surface for guiding the cans from the runway to the said upright convex guiding-surface, substantially as set forth.

6. In a can-elevator, the combination with an upright convex can-guiding surface and opposed flexible can-elevating surface, of a flexible concave can-receiving surface for guiding the cans from the runway to the said upright convex guiding-surface, and means for automatically maintaining said flexible concave receiving-surface at a uniform tension, for the purpose set forth.

7. In a can-elevator, the combination with an upright convex can-guiding surface and opposed flexible can-elevating surface, of a flexible concave can-receiving surface for guiding the cans from the runway to the said upright convex guiding-surface, together with means for adjusting the tension of said flexible concave receiving-surface, for the purpose set forth.

8. In a can-elevator, the combination with an upright convex can-guiding surface of an opposed flexible can-elevating surface consisting of an endless belt traveling upon suitable pulleys, together with a flexible concave can-receiving surface arranged to guide the cans from the runway around the lower belt-pulley and to the said upright convex can-guiding surface, substantially as set forth.

9. In a can-elevator, the combination of an upright convex can-guiding surface, a flexible can-elevating surface consisting of an endless belt traveling upon suitable pulleys, a flexible concave can-receiving surface substantially concentric with the lower belt-pulley, means for adjusting said lower belt-pulley with relation to the said flexible concave receiving-surface, and means for changing the curvature of said flexible concave receiving-surface to conform to the adjustment of the said lower belt-pulley, for the purpose set forth.

10. In a can-elevator, the combination of an upright convex can-guiding surface, a flexible elevating-surface consisting of an endless belt traveling upon suitable rollers, means for adjusting said rollers both horizontally and vertically, a flexible concave can-receiving surface substantially concentric with the lower belt-pulley, and means for changing the curvature of said flexible concave can-receiving surface to conform to the adjustment of the said lower belt-pulley, for the purpose set forth.

11. In a can-elevator, the combination with an upright fixed convex can-guiding surface of an opposed can-elevating surface consisting of an endless belt traveling upon suitable rollers, and means for automatically maintaining the tension of said can-elevating belt for the purpose described.

12. In a can-elevator, the combination of an upright fixed convex can-guiding surface, an endless belt opposed to said upright convex guiding-surface and arranged to elevate the cans over the same, and a roller-weight suspended pivotally and arranged to bear against the descending side of said elevator-belt whereby the belt is held taut while free to adapt itself to any number of cans introduced between its ascending side and the said upright convex can-guiding surface, substantially as set forth.

13. In a can-elevator, the combination of an upright convex can-guiding surface, of an opposed can-elevating surface consisting of an endless belt traveling upon suitable rollers, and a flexible concave can-discharging surface arranged to guide the cans from said upright convex guiding-surface around the upper belt-pulley and onto suitable ways, for the purpose set forth.

14. In a can-elevator, the combination of an upright convex can-guiding surface, an opposed can-elevating surface consisting of an endless belt traveling upon suitable rollers, a flexible concave can-discharging surface arranged to guide the cans from said upright convex guiding-surface around the upper belt-pulley, and onto suitable ways, and means for automatically maintaining said concave can-discharging surface at a uniform tension, for the purpose set forth.

15. In a can-elevator, the combination of an upright convex can-guiding surface, an opposed can-elevating surface consisting of an endless belt traveling upon suitable rollers, a concave can-discharging surface arranged to guide the cans from said upright concave guiding-surface around the upper belt-pulley and onto suitable ways, and means for adjusting the tension of the said flexible concave can-discharging surface, for the purpose set forth.

16. In a can-elevator, the combination of an upright convex can-guiding surface, a flexible can-elevating surface consisting of an endless belt traveling upon suitable rollers, means for adjusting said rollers both horizontally and vertically, a flexible concave can-discharging surface substantially concentric with the upper belt-pulley, and means for changing the curvature of the said flexible concave can-discharging surface to conform to the adjustment of the said upper belt-pulley, for the purpose set forth.

17. In a can-elevator, the combination of an upright convex can-guiding surface, a flexible can-elevating surface consisting of an endless can-receiving surface substantially concentric with the lower belt-pulley, and a flexible concave can-discharging surface, substantially concentric with the upper belt-pulley, whereby the cans are raised to a higher level and discharged in a direction substantially the same as that in which they are received by the elevator, for the purpose set forth.

18. In a can-elevator, the combination of an upright convex can-guiding surface, a flexible can-elevating surface consisting of an endless belt traveling upon suitable rollers, a flexible concave receiving-surface substantially concentric with the lower belt-pulley, a flexible concave can-discharging surface substantially concentric with the upper belt-pulley, and means for adjusting said lower and upper belt-pulleys both horizontally and vertically, for the purpose set forth.

19. In a can-elevator, the combination of an upright convex can-guiding surface, a flexible can-elevating surface consisting of an endless belt traveling upon suitable rollers, a flexible concave can-receiving surface substantially concentric with the lower belt-pulley, a flexible concave can-discharging surface substantially concentric with the upper belt-pulley, means for adjusting said lower and upper belt-pulleys both horizontally and vertically, and means for changing the curvature of the said flexible concave receiving and discharging surfaces to conform to the adjustment of the said lower and upper belt-pulleys respectively, for the purpose set forth.

20. In a can-elevator, the combination of an upright convex can-guiding surface, an opposed flexible can-elevating surface consisting of an endless belt traveling over suitable pulleys, a flexible concave can-receiving surface substantially concentric with the lower belt-pulley, a flexible concave can-discharging surface substantially concentric with the upper belt-pulley, and means for automatically maintaining the tension of said can-elevating belt, for the purpose set forth.

ARCHIBALD E. HOPKINS.
OLIN S. FELLOWS.

Witnesses:
D. W. GARDNER,
FRANK E. ROACH.